United States Patent [19]

Asher et al.

[11] 4,398,927
[45] Aug. 16, 1983

[54] CYCLIC ADSORPTION PROCESS

[75] Inventors: William J. Asher, Fanwood; Agustin F. Venero, Berkeley Heights, both of N.J.

[73] Assignee: Exxon Research and Engineering Co., Florham Park, N.J.

[21] Appl. No.: 324,463

[22] Filed: Nov. 24, 1981

Related U.S. Application Data

[63] Continuation-in-part of Ser. No. 173,475, Jul. 30, 1980, abandoned.

[51] Int. Cl.³ ............................................. B01D 53/06
[52] U.S. Cl. ........................................ 55/34; 55/35; 55/58; 55/60; 55/74; 55/78
[58] Field of Search ................................ 55/30–35, 55/58–60, 62, 68, 74, 75, 78, 26

[56] References Cited

U.S. PATENT DOCUMENTS

| | | | |
|---|---|---|---|
| 2,233,189 | 2/1941 | Altenkirch | 62/271 X |
| 2,790,505 | 4/1957 | Dow | 55/62 X |
| 2,792,071 | 5/1957 | Pennington | 55/34 X |
| 3,009,540 | 11/1961 | Munters | 55/34 |
| 3,176,444 | 4/1965 | Kiyonaga | 55/26 |
| 3,230,689 | 1/1966 | Hussmann | 55/31 X |
| 3,274,751 | 9/1966 | Skarstrom | 55/62 X |
| 3,323,288 | 6/1967 | Cheung et al. | 55/58 |
| 3,405,507 | 10/1968 | Spencer et al. | 55/62 |
| 3,531,916 | 10/1970 | Kulperger et al. | 55/33 |
| 3,542,525 | 11/1970 | Pigford et al. | 55/62 X |
| 3,674,429 | 7/1972 | Collins | 55/31 X |
| 3,712,027 | 1/1973 | Hasz | 55/62 X |
| 3,844,737 | 10/1974 | Macriss et al. | 55/34 |
| 3,866,428 | 2/1975 | Simonet et al. | 55/75 X |
| 4,030,896 | 6/1977 | Wimber et al. | 55/62 X |
| 4,134,743 | 1/1979 | Macriss et al. | 55/34 |
| 4,324,564 | 4/1982 | Oliker | 55/62 X |

FOREIGN PATENT DOCUMENTS

| | | | |
|---|---|---|---|
| 7802803 | 9/1979 | Netherlands | 55/62 |
| 7807100 | 1/1980 | Netherlands | 55/62 |

OTHER PUBLICATIONS

Pan et al., Chem. Eng. Sci., 25, 1653–1664 (1970).
Jacob et al., The Chem. Eng. Jo., 22, 187–202 (1981).
Jacob et al., Separation Science and Technology, 15(8), 1563–1577 (1980).

Primary Examiner—Robert H. Spitzer
Attorney, Agent, or Firm—Joseph J. Dvorak

[57] ABSTRACT

A cyclic adsorption process is provided in which two zones are employed—an adsorption zone and a heat storage zone. A fluid stream containing a solute to be removed therefrom is passed through the adsorption zone and the effluent is then passed through heat storage zone. The conditions under which the stream is passed through the adsorption zone are selected so that the rate of progression of the heat transfer front and mass transfer front are substantially equal. This results in an optimum temperature of the effluent stream for efficient heat recovery in the heat storage zone. During regeneration of the adsorbent, a fluid regenerating stream is passed through the heat storage zone where it is partially heated. At a point between the adsorption zone and the heat storage zone the regenerating fluid stream is further heated, via an additional heat source, and passed through the adsorbent zone. The amount of additional heat is sufficient to effectively desorb the adsorbent. Alternatively, of course, a pressure reduction and a combination of heat addition and pressure reduction may be employed to desorb the adsorbent.

22 Claims, 5 Drawing Figures

CYCLIC ADSORPTION PROCESS

CROSS-REFERENCE TO RELATED APPLICATIONS

This application is a continuation-in-part of U.S. patent application Ser. No. 173,475, filed July 30, 1980, now abandoned.

FIELD OF THE INVENTION

Applicants' invention relates to adsorption separation processes and specifically cyclic adsorption separation processes in which adsorbed material is desorbed from a bed of adsorbent by increasing the temperature of the adsorbent.

BACKGROUND OF THE INVENTION

There are many commercial processes in which separation of one or more materials is achieved by the general technique of: (1) first contacting a fluid mixture with an adsorbent in an adsorbent zone to selectively adsorb one or more materials of the mixture by the adsorbent material, thereby effecting a separation of the mixture components; and (2) subsequently desorbing the adsorbent material by either (a) reducing the total pressure of the bed and then purging the bed at low pressures (pressure swing processes), (b) purging the bed at operating pressures by treating the adsorbent material with an elutant material which has its temperature raised to a point sufficient to promote desorption of the adsorbent material (thermal swing processes), and (c) by purging the bed with an elutant material which displaces the previously adsorbed material, the elutant itself being adsorbed by the adsorbent (displacement desorption processes). Stated differently, in cyclic adsorption processes partition of an adsorbable component between an absorbent and a fluid mixture is achieved by successive adjustment of process conditions promoting adsorption and desorption respectively.

In processes of the above type, the adsorption reaction is virtually always an exothermic reaction and the heat of adsorption generally is removed from the adsorbent zone as sensible heat in the effluent gas. Commonly, the heat of adsorption is wasted, and if utilized, it is not utilized efficiently. Additionally, in thermal swing cyclic adsorption processes, heat is provided in order to desorb the adsorbed material. Failure to efficiently utilize the heat of adsorption as well as requiring inputting thermal energy to achieve satisfactory desorption renders thermal cyclic adsorption processes less energy efficient than is desired. The present invention is directed toward improving the thermal efficiency of cyclic adsorption processes.

PRIOR ART

As exemplary of some prior art adsorption processes, mention is made of the following: U.S. Pat. Nos. 2,223,189; 3,531,916; 3,009,540; and 3,274,751.

In U.S. Pat. No. 2,223,189, an air conditioning apparatus is disclosed which has a series of four zones to effect the drying and cooling of air being used in space conditioning. Heat of adsorption is removed from the dried air by heat exchange with atmospheric air. Separate streams of heated gases are used to regenerate the adsorbent beds in that apparatus.

In U.S. Pat. No. 3,274,751, a process for the removal of various materials from an air stream, in addition to temperature and humidity control, is described. Indeed, two distinct systems are contemplated by the patentee; namely, one system which employs two heat exchange beds for removal of sensible heat from a gas stream and another system which employs two adsorbent beds for removing an adsorbate from a gas stream. In the system utilizing adsorbent, the adsorbent material employed may be one which by its nature has some capacity to absorb heat, thereby incidentally affecting limited temperature control of the gas stream being dried by removing sensible heat from the gas stream.

In U.S. Pat. No. 3,009,540, there is yet another air conditioning apparatus disclosed in which moisture is removed from the air being conditioned by an adsorbent material. The external heat requirement for regenerating the adsorbent bed is lowered, in accordance with the patented method, by partially regenerating the bed with air from the conditioned space which has been partially heated by heat exchange with external air being dried and conditioned for use in conditioned space. As will be noted, two distinct zones are employed for drying and for sensible heat recovery.

Desiccant beds suitable for use in these processes are disclosed in U.S. Pat. Nos. 3,844,737 and 4,134,743, for example. The beds consist of an adsorbent impregnated on sheets or layers of fibrous materials.

In U.S. Pat. No. 3,531,916, a natural gas dehydrating system is disclosed which has two adsorption zones containing adsorbent material which are used such that one of the two adsorption zones is in adsorption service. Thus, a main gas stream is passed through an activated adsorbent material while a minor heated gas stream passes through the moisture-laden adsorbent material. The beds, of course, are periodically alternated for the continuous drying function.

ADDITIONAL PATENT DISCLOSURES

In addition to the prior art processes mentioned above, reference also is made herein to the disclosures in Dutch Patent Nos. 7807100 and 7802803.

In Dutch Patent No. 7807100, a pressure swing adsorption process is described in which a portion of the effluent gas stream is stored in a pressure vessel for subsequent use in purging the adsorbent bed after decreasing the pressure of the bed. In order to increase the capacity of the pressure vessel for storing purge gas, the vessel is charged with a heat capacity material which suppresses temperature fluctuations of the stored gas resulting from compression during storage and expansion during purging.

In Dutch Patent No. 7802803, yet another pressure swing adsorption process is disclosed in which the capacity of the adsorbent is effectively increased by including a heat capacity material in the bed which suppresses bed temperature increases and in which the amount of rinse gas required during desorption also is decreased by virtue of the suppression of temperature decreases during pressure reduction of the bed.

JOURNAL ARTICLES

As an aid in understanding the present invention, reference is made to the journal articles listed below.

First, a simplified theoretical treatment of adiabotic adsorption has been presented by Pan et al, Chem. Enq. Sci., 25, 1653–1664 (1970).

Second, although not concerned with cyclic regenerative adsorption processes, further analysis of the response of a fixed bed of adsorbent to changes in the temperature and the concentration of adsorbate in fluid feed can be found in Jacob et al, *The Chem. Enq. Jo.,* 22, 187–101 (1981) and Jacob et al, *Separation Science and Technology,* 15(8), 1563–1577 (1980).

SUMMARY OF THE INVENTION

In the simplest and broadest sense, the present invention contemplates a cyclic adsorption process in which the relative velocities of the heat and mass transfer fronts through the adsorbent during adsorption are adjusted so as to be substantially equal and in which the heat of adsorption generated during the adsorption cycle is stored for use in the desorption cycle. The relative velocities of heat and mass transfer fronts are adjusted by changing bed operating conditions, such as temperature, pressure and concentration of adsorbate in the feed fluid. Typically in cyclic adsorption processes, the velocity of heat transfer front through the adsorption bed is greater than the velocity of the mass transfer front through the bed, and in the practice of the present invention the velocity of the former is decreased to substantially match that of the latter, preferably by adding a heat capacity material in sufficient amount to the adsorbent. Also, in the practice of the present invention, adsorbent is desorbed by using the stored heat of adsorption to heat a purge gas or elutant. For effective desorption, it is necessary, of course, to add an incremental amount of heat to desorb the adsorbent or, optionally, by reducing the pressure of adsorbent.

In a preferred embodiment then of the present invention, heat capacity material is added to the adsorbent in an adsorbent zone thereby effectively decreasing the velocity of the thermal front through the adsorbent zone. In this way, the temperature in the adsorbent zone is increased, and indeed so too is the temperature of the outlet effluent increased above the temperature that would otherwise exist in that zone or at the outlet in the absence of heat capacity material. To provide for optimum higher operating temperatures, the amount of heat capacity material relative to the amount of adsorbent material used in the adsorbent zone must be an amount sufficient to provide for a rate of progression of a heat transfer front through the adsorbent zone during adsorption which is substantially equal to the rate of progression of the mass transfer front through the adsorbent zone. Under these conditions, the temperature rise at the adsorption zone outlet is maximized. Stated differently, the heat of adsorption is removed from the adsorption zone in the bed effluent at a maximum temperature. Thereafter, the high temperature generated during the adsorption cycle and removed via the bed effluent is stored by a heat capacity material in a heat storage zone. During the desorption cycle, the higher temperature in the heat storage zone can be effectively used to desorb the adsorbent, thereby reducing the additional heat required for desorption.

Thus, in one embodiment of the present invention, a cyclic adsorption process is provided in which two zones are employed—an adsorption zone and a heat storage zone. The velocity of mass and heat transfer fronts through the adsorption zone are adjusted so as to be substantially equal. Indeed, it is particularly preferred that the adsorption zone consist of an adsorbent material and a heat capacity material in amounts sufficient to provide for the rate of progression of the thermal front through the adsorbent to be substantially equal to the rate of progression of the mass transfer front through the adsorbent when a fluid mixture containing a solute for removal by adsorption is passed through that zone. The heat storage zone consists of a heat capacity material. In operation, a fluid mixture is passed through the adsorption zone and then through the heat storage zone. The solute is adsorbed by the adsorbent and a portion of the sensible heat of the fluid stream and the heat of adsorption is stored in the adsorption zone for at least a portion of the cycle and a portion of the heat is stored in the heat storage zone. During regeneration of the adsorbent, a fluid regenerating stream is passed through the heat storage zone where it is partially heated. At a point between the adsorption zone and the heat storage zone, the regenerating fluid stream is further heated, via an additional heat source, and passed through the adsorbent zone. The amount of additional heat is sufficient to effectively desorb the adsorbent.

In yet another embodiment of the present invention, a desiccant adsorption process is provided in which a pair of rotatable wheels are used through which a stream of gas, e.g., moist air, is flowed. These wheels are divided generally into three zones. The first zone consists primarily of adsorbent material. The second zone consists of heat capacity material and adsorbent material with the relative quantities adjusted such that during the adsorption portion of the drying cycle, the progression of the heat transfer front through the second zone substantially matches the progression of the mass transfer through the second zone. Finally, the third zone consists of a heat capacity material. In operation, the gas to be dried is flowed through the wheels in the direction of zone 1 to zone 3. Gas for regeneration can be returned through the wheels from zone 3 through zone 1. Means also are provided to transfer heat into the air or inject heated air at a point between zones 2 and 3 for flow in the direction of zone 2 to 1 for regeneration of the adsorbent material.

For a fuller understanding of the nature of the invention, reference should be made to the following detailed description taken in connection with the accompanying drawings.

DESCRIPTION OF THE ILLUSTRATED EMBODIMENTS

Figure 2:
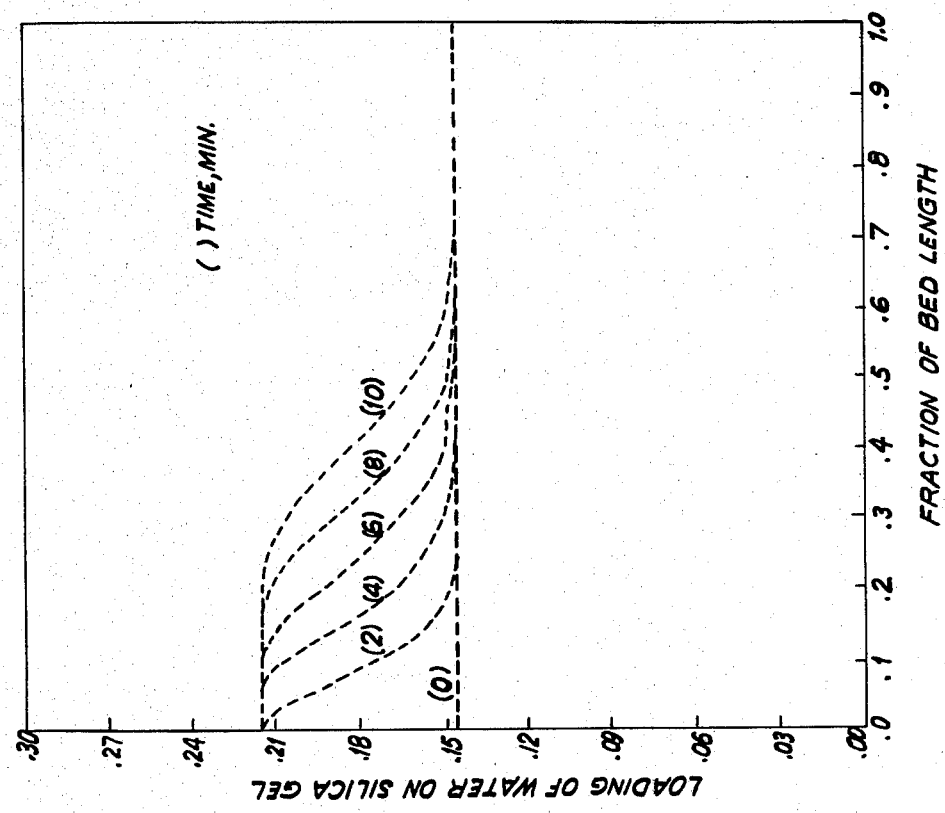
FIG. 2 is a graphic representation of a mass transfer front moving through a bed of adsorbent material.

In the description which follows, reference is made to specific embodiments of the present invention for the purpose of illustration. Hence, mention is made of water adsorption processes and particularly a desiccant cooling process. Nonetheless, it will become apparent upon further reading of the description which follows that this invention has broad applicability to adsorption/separation processes generally.

Examples of such adsorption processes, in addition to those specifically illustrated hereinafter, in which the invention is eminently suitable, include separation of hydrocarbons such as the separation of isopentane from normal pentane, the separation of isobutane from normal butane and the separation of isohexane from normal hexane. Other important separation processes to which the instant invention is applicable include the removal of hydrogen sulfide from a wide variety of light hydrocarbons, the purification of hydrogen in hydrogen manufacture, separation of carbon dioxide from ethylene and the like.

As will become further apparent, the adsorption process of the present invention can be practiced using a single packed adsorption bed in a cyclic manner or a multiple set of adsorption beds in a continuous manner.

(a) General Description of the Invention

As will be readily appreciated, in passing a fluid containing a solute through an adsorbent bed generally the solute is removed from the fluid rather completely by the adsorbent which the solute first contacts; the solute-free fluid, of course, continues to pass through the bed and out. As more and more fluid containing solute is fed through the bed, an equilibrium eventually is reached with the adsorbent in the upstream portion of the bed, and, consequently, the solute is adsorbed at a point in the bed. Thus, the boundary region between a solute-saturated adsorbent upstream and a solute-free adsorbent downstream in an adsorbent bed has been referred to generally as a mass transfer front or adsorption wave and that front continues to move through the bed as fluid containing solute continues to flow through the bed. When the mass transfer front reaches the end of the bed, the fluid flow must be interrupted and the bed regenerated. Similarly, in a non-isothermal adsorption process, the thermal energy released in the sorption process or introduced with the feed also moves through the bed in the form of a thermal front or wave. In other words, there is a thermal boundary between that part of the bed or zone where heat is being transferred between bed solids and inlet fluid and the section of the bed where fluid and bed solids have attained thermal equilibrium. The rate at which the thermal front progresses through the bed, however, is not the same as the rate at which the mass front progresses through the bed. Indeed, the velocity of the thermal front through the bed in generally greater than the velocity of the mass transfer front. In this regard, see, for example, Pan et al, *Chem. Eng. Sci.*, 25, p. 1653–1664 (1970).

Figure 1:
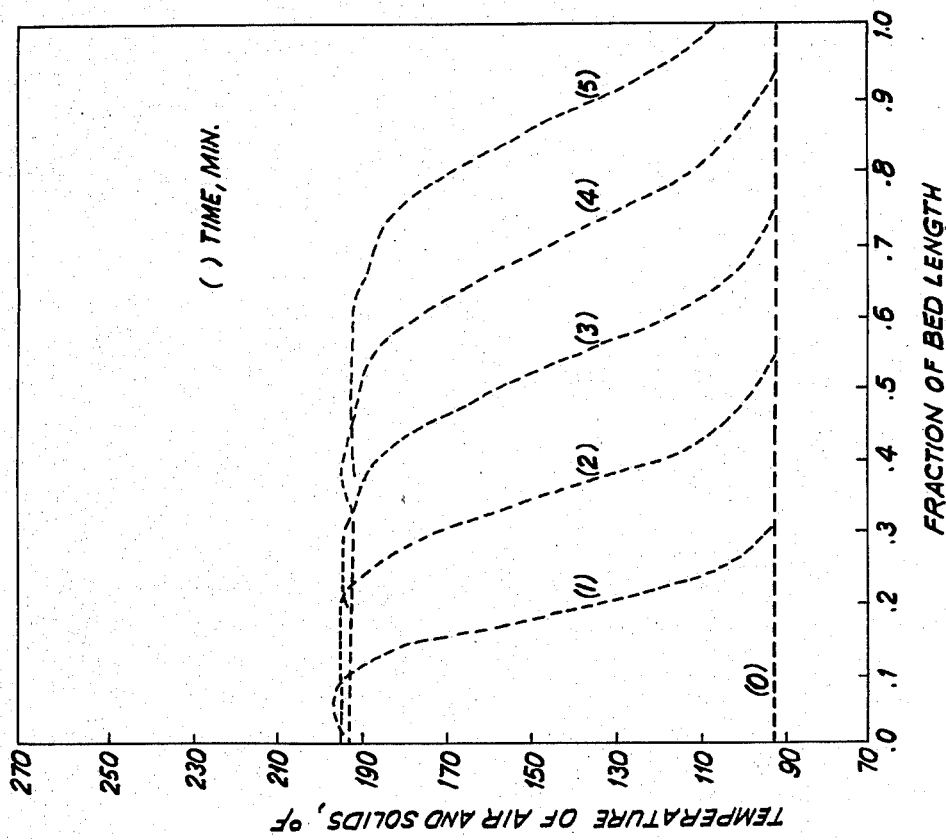
FIG. 1 is a graphic representation of the heat transfer front moving through a bed of heat capacity material.

By way of example, FIG. 1 graphically illustrates the movement of a heat transfer front through a packed bed of stainless steel balls using a fluid at 194° F. flowing through the bed. After between 4 and 5 minutes, the thermal front breaks through the end of the bed. FIG. 2 graphically illustrates the progression of a mass transfer front through a bed of silica gel using humid air as the fluid being passed through the bed.

As indicated hereinabove, it is an essential feature of the present invention that more efficient adsorption processes can be achieved if the relative velocities of the heat transfer and mass transfer fronts through the adsorption zone are substantially equal. Basically, the greater the difference in velocity between the heat and mass transfer fronts, the lower the temperature of effluent leaving the adsorption zone will be, thereby making heat recovery less efficient. In contrast, substantially synchronous progress of mass and thermal fronts through the adsorption zone results in a maximum temperature in the bed effluent, thereby enhancing heat recovery. In this manner, the heat initially in the adsorption zone and the heat of adsorption is stored in a heat storage zone at a temperature which is higher than that obtainable otherwise so that the higher temperature stored heat can be used during desorption with only an incremental amount of additional heat necessary to bring about the desorption.

Consider that in order to store effectively the heat of adsorption at a high enough temperature to be useful for desorption, the conditions of the process (specifically the operating temperature, pressure and concentration range), as well as the effective heat capacity of the adsorbent bed, are adjusted to ensure that the velocities of the heat and mass transfer fronts within the bed are substantially equal. Under these conditions, the temperature rise at the bed outlet is maximized. For an idealized process which operates between the limits of a uniformly saturated bed at the end of the adsorption cycle and a uniformly desorbed bed (uniform adsorbed phase concentration) at the end of the desorption cycle, the velocities of the heat and mass transfer fronts will be synchronized when the following condition is fulfilled:

$$\Delta q_o / \Delta C_o = C_s / C_f$$

In this equation $\Delta q_o$ refers to the difference in adsorbed phase concentrations between the end and the beginning of the adsorption step express as moles per unit total volume of solid (adsorbent plus insert solid); $\Delta C_o$ is the corresponding change in fluid phase concentration, expressed as moles per unit fluid volume; $C_f$ is the heat capacity of the fluid (calories per unit fluid volume per degree); $C_s$ is the average heat-capacity of the solid (adsorbent plus inert material) expressed as calories per unit volume of total solid per degree. (If the bed contains a volume fraction x of adsorbent with heat capacity $C_1$ and volume fraction $1-x$ of inert material with heat cpacity $C_2$, then $C_s = X\ C_1 + (1-x)C_2$.)

Obviously, a practical adsorption process rarely, if ever, operates between two completely uniform concentration conditions throughout the adsorption bed or zone. Nonetheless, a cyclic adsorption process may be improved in accordance with the present invention by adjusting either the heat capacity ratio $C_s/C_f$, the ratio of the concentration changes $\Delta q_o / \Delta c_o$ or both these ratios so that the $C_s/C_f$ ratio is substantially equal to the ratio of $\Delta q_o / \Delta c_o$. As a practical matter for a process involving adsorption from the gas phase, the ratio $\Delta q_o / \Delta c_o$ is generally greater than the ratio of heat capacities $C_s/C_f$. Thus, the condition for substantial synchronization of the frontal velocities is simply achieved by the addition of inert heat capacity material to the adsorption zone or bed, thereby increasing the effective value of $C_s$, while at the same time decreasing $\Delta q_o$ (for a given $\Delta c_o$).

From the foregoing, it should be apparent that the related velocities of the heat and mass transfer fronts can be adjusted so as to be substantially equal by various combintions of techniques. In addition to the previously mentioned adjustment of the effective heat capacity of the solid by the addition of inert heat capacity material to the adsorbent bed, the relative velocities of the heat and mass transfer fronts may be adjusted by the choice of adsorbent material, the choice of operating conditions, specifically the temperature and pressure and concentration range for adsorption and desorption, and by adjustment of the heat capacity of the fluid phase through the addition of an inert component.

To illustrate the significance of this invention in connection with a preferred embodiment thereof, consider the following computer simulation of the performance of two separate beds in drying moist air, one bed containing solely silica gel and the other bed containing aluminum dispersed in silica gel in the weight ratio of 5:1 or 1.07 Btu/°F./lb silicon gel. The total amount of silica gel in each bed is the same. Additional assumptions used are given in Table I below:

TABLE I

| Flow Rate | (1.0 lb air/lb silica gel/min) |
|---|---|
| Initial Bed Temperature | 200° F. |
| Initial Bed Loading | .021 lb $H_2O$ / lb silica gel |
| Inlet Air Temperature | 95° F. |
| Inlet Air Humidity | .014 lb $H_2O$ / lb air |

Calculation of the streams exiting the beds in a single step process for an 8 minute period is given in Table II below:

TABLE II

| Bed Type | Ave humidity of dry air (lb $H_2O$/lb air) | Ave Exit Temp. of Dry Air (°F.) |
|---|---|---|
| Silica gel | $5.39 \times 10^{-3}$ | 157 |
| Silica gel and aluminum | $6.63 \times 10^{-3}$ | 187 |

Taking the effluent from the adsorbent bed into a heat storage bed and cycling the beds using the thermal energy stored in the heat storage bed plus an added amount of energy to aid in regeneration (270 Btu/hr/lb silica gel), upon calculation produces results for the two beds, once they have reached steady state conditions, which are shown in Table III below:

TABLE III

| Bed Type | Ave humidity of dry air (lb $H_2O$/lb air) | Ave Exit Temp. of Dry Air (°F.) |
|---|---|---|
| Silica gel | $8.45 \times 10^{-3}$ | 130 |
| Silica gel and aluminum | $6.97 \times 10^{-3}$ | 181 |

As can be seen from the foregoing simulation, the air leaving the bed containing adsorbent and heat capacity material dispersed with adsorbent is 21% drier than the air leaving the bed containing solely adsorbent. Stated differently, in order for the pure adsorbent bed to provide air having the same average humidity as that obtained with the adsorbent and heat capacity bed, 379 Btu/hr/lb silica gel of energy is required for regeneration. This is 40% more energy than that required by the bed containing both adsorbent and heat capacity material.

From the foregoing, it is apparent that as a fluid containing a component to be adsorbed is passed through an adsorbent bed containing only adsorbent, the heat of adsorption is effectively removed in the form of a separated effluent stream at some temperature higher than the inlet temperature but at a temperature which is lower than required for optimum regeneration of the bed. If the bed, however, contains both an adsorbent material and a heat capacity material as in this invention, then the heat of adsorption is effectively used to raise the temperature of the adsorbent bed and the effluent stream, thereby minimizing the amount of additional heat required to desorb the bed.

The heat capacity material employed in the practice of the present invention can be selected from a wide range of materials, such as metals, plastics, ceramics and the like and used in any number of forms or shapes, such as spheres, fibers, granules, sheets and the like. The heat capacity material, however, should be able to transport heat rapidly in a direction normal to the flow of fluid through the adsorption zone. Indeed, the thermal properties of the zones containing heat capacity material, particularly with the adsorbent, should be such that the difference in temperature between the middle of any particle of heat capacity material and the gas in the plane normal to gas flow through the zone contacting the heat capacity material be less than about 3° F. and preferably less than 1° F.

The adsorbent used, of course, will depend upon the specific adsorption process to be performed. Typical adsorbents useful in the practice of the present invention include silica gel, alumina and zeolites.

As will be readily appreciated, it is difficult to calculate the proper ratio of heat capacity material to adsorbent material for any given separation process, especially since the heat of adsorption commonly is moved back and forth through the adsorption bed in cycling the bed from adsorption through desorption ad infinitum. Also different materials have different heat capacities. Nonetheless, the proper ratios of materials can be selected in the following manner: First the temperature required to desorb from 90% to 95% of a given loading of adsorbate on adsorbent is readily obtainable from published isobar data. The ratio of heat capacity material to adsorbent which will produce this temperature in the bed containing adsorbent and heat capacity material is the preferred ratio. Next, a series of cyclic adsorption tests are performed with a specific test fluid and adsorbent. The ratio of heat capacity material to adsorbent is varied and the temperature of the bed is determined. The amount of heat capacity material is then increased and the test repeated until the optimum temperature is achieved, i.e., the temperature which is sufficient to desorb from about 90% to about 95% of the adsorbate contained in the adsorbent.

As a general guide, the mass of heat capacity material to be used per pound of adsorbent is such that the product of the mass and the heat capacity will be in the range of about 0.2 to about 50 Btu/°F./lb of adsorbent. When the adsorbent is silica gel, this range is from about 0.2 to about 6.0 Btu/°F./lb, and preferably 0.5 to 2.0 Btu/°F./lb of silica gel.

As indicated, a preferred embodiment of the present invention contemplates an adsorption process using at least two zones, a first zone containing heat capacity material and adsorbent, as hereinabove described, and a second zone containing solely heat capacity material. Optionally, additional zones containing solely adsorbent material may be employed. For example, at least three separate zones may be employed. The first zone, zone 1, consists substantially entirely of adsorbent material. In the second zone, 2, a combination of heat capacity material and adsorbent is employed. Zone 3 contains solely heat capacity material. Using an optional pure adsorbent zone (zone 1) permits one to take at least partial advantage of the higher temperatures generated in the zone containing adsorbent and heat capacity material while using less total mass then if only a single adsorption zone containing heat capacity material was employed.

If a pure adsorbent zone is employed, as much as 80% of the total adsorbent can be incorporated in that first zone while still obtaining substantial benefit from the remaining 20% of the adsorbent in zone 2; however, in such instances, it is preferable to limit the quantity of adsorbent in zone 1 to 50% of the total adsorbent being employed. The ratio of heat capacity material to adsorbent in the zone containing both materials is selected as hereinabove described and is such that during the adsorption portion of the cycle the progression of the heat transfer front through this zone substantially conforms to the progression of the mass transfer front through this zone. Additionally, it should be noted that the adsorbent used in zone 2 generally is the same adsorbent used in zone 1; however, different adsorbents may be used in zones 1 and 2. As stated, the third zone, zone 3, consists entirely of heat capacity material. The function of this zone is to store heat removed from zones 1 and 2 by the effluent so that is can be utilized for desorption.

It should be appreciated that separate beds or zones may be used in practicing this invention. Optionally, however, a single bed with continguous zones also may be employed.

It has been determined that the quantity of fluid processed during the adsorption step of a cyclic adsorption process utilizing the present invention will affect the overall efficiency achieved by the process. Thus, rather than continue the adsorption cycle to a point just short of breakthrough as is the procedure conventionally employed in adsorption process, it is preferred in the practice of the present invention to empirically determine the preferred amount of fluid that should be treated. One simple technique that can be used in this determination is to vary the cycle time for a given flow of fluid until an optimum efficiency is obtained for that process. The amount of fluid treated which will provide for a high overall efficiency and preferably the optimum overall efficiency will best be used in practicing this invention. The amount of fluid to be processed in the practice of the invention can be expressed in terms of mass of fluid processed per unit mass of adsorbent used, e.g., the sum of adsorbent used in zones 1 and 2. In drying ambient air to a suitable level for use in desiccant cooling, for example, 2 to 40 lbs of air/lb of silica gel, and preferably 4 to 20 lbs of air/lb of silica gel should be treated.

It also should be appreciated that the fluid being treated need not be the same as the fluid used during the desorption cycle; in any event, however, the product of the specific heat and mass of the fluid used during desorption should not differ by more than 15%, and preferably not more than 10% of the product of the specific heat and mass of the fluid treated during the adsorption step.

Now to illustrate adjusting the relative velocities of heat and mass transfer fronts without the addition of heat capacity material, consider the need to remove $CO_2$ from a gas stream which is available at 5 atm pressure and any temperature between 150° C. and 45° C. depending on the point at which the gas is withdrawn for purification. The chosen purification process involves the use of molecular sieve 4A adsorbent in a conventional cyclic fixed bed adsorption system with regeneration at high temperature (200° C.) by thermal swing. The conditions under which the velocities of the thermal and concentration fronts will be substantially the same in the process is estimated from heat capacity and equilibrium data. The calculations summarized in Table IV are based on the following values:

Heat capacity of 4A sieve adsorbent 0.19 cal/gm deg C
Particle density of adsorbent = 1.15 gm/cm$^3$
Heat capacity of gas stream = 7.8 cal/mole deg C
Residual $CO_2$ concentration in desorbed bed $\approx 0.5 \times 10^{-3}$ mole/cm$^3$ (adsorbent particle volume basis)

TABLE IV

| Operating Temp Deg C. | $C_s/C_f$ | Adsorbed Phase Concentration of $CO_2$ $q_o$ (m mole/gm) | $\Delta q^o$ m moles/cm$^3$ adsorbent | $\Delta q_o / \Delta c_o$ |
|---|---|---|---|---|
| 45 | 147 | 2.5 | 2.4 | 310 |
| 70 | 159 | 1.91 | 1.7 | 239 |
| 100 | 173 | 1.45 | 1.17 | 177 |

Clearly at 100° C. the ratio $C_s/C_f$ is approximately equal to the ratio $\Delta q_o / \Delta c_o$ and the velocity of the thermal and concentration fronts will be substantially the same, permitting optimal efficiency of heat recovery.

Further illustrations of the present invention will be set forth hereinafter in connection with use of heat capacity material in the adsorbent zone as a means of adjusting the velocity of the heat transfer front so as to be substantially equal to the velocity of the mass transfer front.

(b) Single Bed Embodiment

Figure 3:
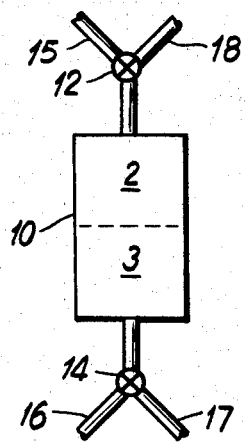
FIG. 3 is a schematic diagram illustrating a process in accordance with one embodiment of this invention.

Referring now to a single bed embodiment of the present invention shown in FIG. 3, there is provided a bed 10 which is divided into two zones, 2 and 3; zone 2 consisting entirely of adsorbent and heat capacity materials in the ratio prescribed by this invention, and zone 3 consisting entirely of heat capacity material. In this embodiment, the adsorbent bed is shown fitted with two three-way valves 12 and 14. Fluid material to be treated in the adsorbent bed is introduced via line 15 through valve 12 and separated effluent is removed via line 16 through valve 14. During the desorption cycle, an elutant is introduced via line 17 through valve 14 into bed 10 and the elutant and adsorbed material are removed via line 18 through valve 12. The eluting fluid is heated by the heat capacity material in zone 3 of bed 10. At a point prior to the eluting fluid entering zone 2, an incremental amount of heat is provided, for example, by an electric resistance heater between zone 2 and zone 3 to raise the temperature of the elutant sufficiently to desorb the adsorbent in zone 2. Since some of the heat of adsorption generated during the adsorption cycle is effectively stored at a high temperature, the incremental amount of additional heat required to desorb the bed is considerably less than in adsorption processes in which no heat capacity material is employed in the adsorbent bed.

(c) Multiple Bed Embodiment

Figure 4:
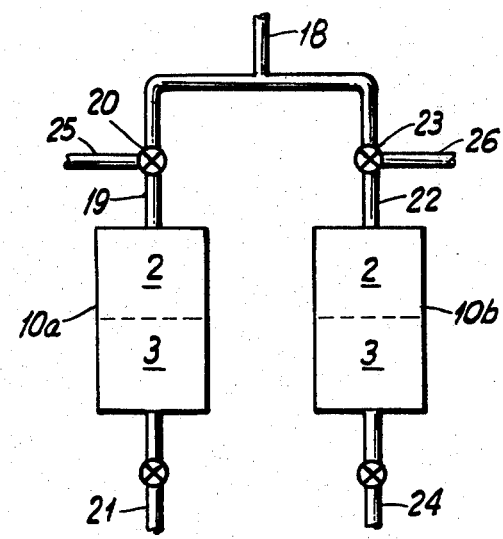
FIG. 4 is a schematic diagram illustrating a process in accordance with a second embodiment of this invention.

Referring now to the embodiment as shown in FIG. 4, a fluid mixture to be separated is introduced into adsorbent bed 10a via line 18, 19 and three-way valve 20, and effluent is removed via line 21 and a component of the fluid is adsorbed therein. As in the single bed embodiment, bed 10a has two zones, 2 and 3. Zone 2 consists of adsorbent and heat capacity materials, and zone 3 consists entirely of heat capacity material. Means are provided for adding an incremental amount of heat at a point between zone 2 and zone 3 of each bed. When it is time to regenerate bed 10a, the fluid mixture to be separated is fed into adsorbent bed 10b via line 22 and three-way valve 23. Bed 10b, of course, has the same two zones as bed 10a. While the fluid mixture is being separated in bed 10b, bed 10a is regenerated by adding elutant material to bed 10a via line 21. The elutant is heated by the heat capacity material in zone 3 and then further heated by the heating means intermediate zone 2 and zone 3. The desorbed material and the elutant are then removed via line 25.

After regeneration of bed 10a, bed 10b can be regenerated while bed 10a is again used for adsorption by feeding the fluid mixture to be treated through lines 18 and 19 into bed 10a by properly positioning valve 23. For the regeneration of bed 10b, elutant is introduced via line 24 and the desorbed material and elutant are subsequently removed via line 26.

(d) Desiccant Cooling Process

Figure 5:
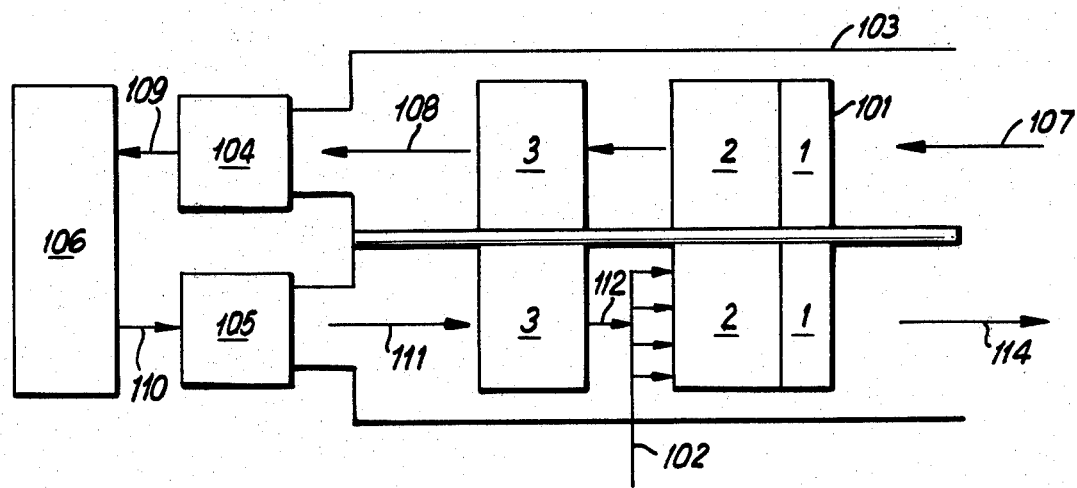
FIG. 5 is a schematic diagram of a process in accordance with a generally preferred embodiment of the present invention.

In the desiccant cooling process shown in FIG. 5, the system consists of a cylindrical segmented multizone heat exchange and desiccant wheel 101. Indeed, in this embodiment, three zones are shown. These are: Zone 1 containing desiccant; Zone 2 containing desiccant and heat capacity material; and Zone 3 containing solely heat capacity material.

In FIG. 5, zone 3 is shown as being distributed around an axis common to zones 1 and 2 and as being noncontiguous with zone 2 and separated therefrom. This distinct separation, however, is not necessary and zone 3 optionally is contiguous with zone 2.

Gas channels are provided in wheel 101 for the introduction of heated elutant fluid as shown by line 102. The direction of flow of stream 102 is indicated by the terminal arrows.

Wheel 101 is within a housing 103 for appropriately dividing the flow of gas through the desiccant and heat adsorbing material. Additionally, conventional air cooling water evaporators 104 and 105 are provided.

In the normal cooling operation, ambient outside air 107 is introduced into the segmented portion of the rotating wheel 101 by a fan (not shown). Moisture in the air is adsorbed by the hydroscopic material in zone 1 and subsequently by the material in zone 2. Much of the heat of adsorption is taken up by the heat capacity material in zone 2. Since the dry air now is at a higher temperature than the incoming ambient or moist air, it is passed through a heat capacity material in zone 3 where the temperature of the dry air is lowered. After passing over zone 3, the dry air 108 with its temperature lowered is then passed through the evaporator 104. Water is evaporated into the dry air and the latent heat of vaporization is thereby extracted from the air, cooling it. The cool moist air stream 109 is then passed into the space to be conditioned 106. Relatively warm air 110 from the conditioned space is then introduced into evaporator 105 where water is evaporated into the air and the latent heat of vaporization is extracted from the air, thereby lowering its temperature. This now cooler moist air stream 111 is then introduced into the segmented portion of heat capacity zone 3 of wheel 101 where it has its temperature raised by the thermal energy stored in this portion of the wheel. The effluent stream 112 is further heated by heat exchanger 102 and introduced into zone 2 of wheel 101 where it is used to desorb the desiccant. The resultant warm moist air is rejected via line 114 to the outside. The heat which has been added to this stream is used to desorb the previous adsorbed water from desiccant in zone 2 and increase the temperature of both the desiccant and heat capacity material in zone 2. The very moist air flows through zone 1 and is rejected to the outside via line 114. The elevated temperature heat front moves through zone 2 and perhaps some of zone 1 but is prevented from reaching the outlet end of zone 1 so that the very moist air exiting through line 114 to complete the cycle is only at a moderately higher temperature (above 15° F.) than ambient air.

Heat can be provided to heat exchanger 102 by conventional means such as via a gas firing or an electric heater. Alternatively and preferably, heat is provided by a solar heater.

One of the significant advantages of the present invention is that by storing the heat of adsorption in the bed at high temperature, the incremental amount of heat necessary to desorb the bed is relatively small, and consequently, the overall efficiency of the process is greatly enhanced. Moreover, in a solar assisted desiccant cooling process, the amount of solar collector area required for bed regeneration is significantly reduced, thereby significantly lowering the capital cost of such a system since the cost of the solar collector is a major factor in the cost of the system.

EXAMPLE

To further illustrate the improvement obtained in accordance with the present invention, the following test was conducted:

A bed six inches in diameter and five inches in length was charged with silica gel and aluminum of 8–20 mesh size to provide two zones as follows:

Zone 1: solely silica gel, one inch long
Zone 2: silica gel and aluminum in the weight ratio of 1:13 or 2.78 Btu/°F/lb of desiccant four inches long.

A heat storage or third zone, was provided which was six inches in diameter and five inches long and charged with stainless steel balls one mm in diameter. An air stream with an absolute humidity of 0.014 lb $H_2O$ /lb air and a temperature of 95° F. was fed through zones 1, 2 and 3 at a rate of 0.95 lb air/lb silica gel/min. The regeneration of the bed was performed using air of the same humidity and the same flow rate passing through zones 3, 2 and 1 in that order. The energy needed in the regeneration was provided by the energy stored in zone 3 during the air drying step and by an electric heater operating at a rate of 90 watts which is substantially equivalent to 263 Btu/hr/lb silica gel. Table V gives the average humidity exiting the desiccant/heat capacity bed under steady state conditions. This value is compared with the calculated values for a similar desiccant-/heat capacity bed and a pure silica gel bed under the same conditions. All the beds compared have the same total amount of silica gel and the same heat storage zone. Total cycle time was 12 minutes divided equally between the drying step and the regeneration step.

TABLE V

| Bed Type | Exptl. Ave. Humidity Lb $H_2O$ / Lb Air | Calc. Ave. Humidity Lb $H_2O$ / Lb Air |
|---|---|---|
| Silica Gel/Alumina | .0078 | .0079 |
| Pure Silica Gel | | .0090 |

From the foregoing, it can be seen that for the same amount of energy used in the regeneration, the process of this invention provides an air stream that is drier by 14% than that calculated for a bed using solely silica gel. In terms of energy used, 680 Btu per pound of water removed from the air stream was required in the process of the invention as compared with 840 Btu, or 21% more energy, per pound of water removed from the bed containing solely silica gel.

What is claimed is:

1. An improved cyclic adsorption process comprising:
   passing a fluid stream containing an adsorbate to be removed therefrom through an adsorption zone and then through a heat storage zone, said fluid being passed through said adsorption zone under conditions sufficient to provide that the velocity of the heat transfer front and the velocity of the mass transfer front through said adsorption zone are substantially equal; and
   regenerating said adsorbent by passing a regeneration stream through said heat storage zone and then through said adsorption zone whereby said regeneration stream is heated in said heat storage zone.

2. The process of claim 1 wherein desorption of said adsorption zone is achieved by a technique selected from the group of:
   (a) adding an incremental amount of heat to said regeneration stream at a point between said heat storage zone and said adsorption zone, said incremental amount of heat being sufficient to raise the temperature of said regeneration stream to a point sufficient for removing said solute from said adsorbent in said adsorption zone whereby said adsorbent is regenerated; and
   (b) decreasing the pressure in said adsorption zone when said regeneration stream is passed through said adsorption zone, said decrease in pressure being in an amount sufficient to remove solute from said adsorbent in said adsorption zone; and
   (c) adding an incremental amount of heat to said regeneration stream at a point between said heat storage zone and said adsorption zone by simultaneously reducing the pressure in said adsorption zone, said incremental amount of heat and said pressure decrease being sufficient for removing said solute from said adsorbent in said adsorption zone whereby said adsorbent is regenerated.

3. The process of claim 2 wherein said fluid stream being passed through said adsorption zone is at a predetermined operating temperature and concentration of adsorbate whereby the velocity of the heat and mass transfer fronts through said adsorption zone are substantially equal.

4. The process of claim 3 wherein a heat capacity material is added to said adsorption zone whereby said velocity of said heat transfer and mass transfer fronts are substantially equal.

5. A method of improving the thermal efficiency of a cyclic adsorption process of the type wherein a fluid stream containing an adsorbate to be removed therefrom is passed through an adsorption zone and then through a heat storage zone during the adsorption cycle and wherein a regenerating stream is passed through said heat storage zone and then through said adsorption zone during the regeneration cycle, the improvement comprising adjusting the relative rate of velocity of the heat transfer front and mass transfer front through said adsorption zone so as to be substantially equal.

6. The method of claim 5 wherein said relative velocities are adjusted by selecting operating conditions under which the ratio $\Delta q_o / \Delta C_o$ is substantially equal to the ratio $C_s/C_f$ wherein $\Delta q_o$ is the change in adsorbed phase concentration expressed as moles per unit total volume of solid, $\Delta c_o$ is the difference in fluid phase concentrations between the end and the beginning of the adsorption step expressed as moles per unit fluid volume, $C_f$ is the heat capacity of the fluid in calories per unit fluid volume per degree and $C_s$ is the average heat capacity of the solid material in the adsorbent zone.

7. The method of claim 6 wherein the relative velocity of the heat and mass transfer fronts are adjusted by the addition of a heat capacity material to the adsorption zone in an amount sufficient that the ratio $C_s/C_f$ is substantially equal to the ratio $\Delta q_o / \Delta c_o$.

8. An improved cyclic adsorption process comprising:
   passing a fluid stream containing an adsorbate to be removed therefrom through an adsorption zone and then through a heat storage zone, said adsorption zone containing an adsorbant and heat capacity material, said heat capacity material being present in an amount sufficient to provide a temperature in said adsorption zone under operating conditions which is higher than the temperature that otherwise would exist in said adsorption zone under operating conditions;
   regenerating said adsorbent by passing a regeneration stream through said heat storage zone and then through said adsorption zone whereby said regeneration stream is heated in said heat storage zone; and
   adding an incremental amount of heat to said regeneration stream at a point between said heat storage zone and said adsorption zone, said incremental amount of heat being sufficient to raise the temperature of said regeneration stream to a point sufficient for removing said adsorbate from said adsorbent in said adsorption zone whereby said adsorbent is regenerated.

9. The process of claim 8 wherein the amount of heat capacity material contained in said adsorption zone is sufficient to provide a temperature which will desorb from 90% to 95% of the solute adsorbed by the adsorbent.

10. The process of claim 9 wherein the amount of heat capacity material per pound of adsorbent in said adsorption zone is such that the mass of heat capacity material times its heat capacity is in the range of from about 0.2 to 50 Btu's/°F/lb of adsorbent.

11. The process of claim 10 wherein the fluid stream is air and where said adsorbent is a desiccant.

12. The process of claim 11 wherein the desiccant is silica gel and the ratio of heat capacity material per pound of silica gel in said adsorption zone is such that the product of mass of the heat capacity material times the heat capacity of such material is in the range of from about 0.2 to 6.0 Btu/°F/lb of silica gel.

13. The process of claim 12 wherein the desiccant is silica gel and the ratio of heat capacity material per pound of silica gel in said adsorption zone is such that the product of mass of the heat capacity material times the heat capacity of such material is in the range of from about 0.5 to 2.0 Btu/°F/lb of silica gel.

14. The process of claim 13 wherein the product of the specific heat and the mass of the regeneration stream used is not more than 15% greater than the product of the specific heat and mass of fluid stream used.

15. An improved cyclic adsorption process comprising:
passing a fluid stream containing a solute to be removed therefrom through an adsorption zone and then through a heat storage zone whereby a heat transfer front and a mass transfer front are generated and progress through said adsorption zone and said heat storage zone, said adsorption zone containing an adsorbent and a heat capacity material, said adsorbent and said heat capacity material being present in a weight ratio sufficient to provide for a rate of progression of said heat transfer front through said adsorption zone which is substantially equal to the rate of progression of said mass transfer front through said adsorption zone;
regenerating said adsorbent by passing a regeneration stream through said heat storage zone and then through said adsorption zone, whereby said regenerating stream is heated in said heat storage zone; and
promoting desorption of said adsorbent by the technique selected from
(a) adding an incremental amount of heat to said regeneration stream at a point between said heat storage zone and said adsorption zone, said incremental amount of heat being sufficient to raise the temperature of said regeneration stream to a point sufficient for removing said solute from said adsorbent in said adsorption zone; (b) decreasing the pressure of said adsorbent zone in an amount sufficient to remove solute from said adsorbent: and (c) adding an incremental amount of heat to said regeneration stream and reducing said pressure in said adsorption zone in combined amounts sufficient to remove solute from said adsorbent whereby said adsorbent is regenerated.

16. The process of claim 15 wherein the product of the specific heat and the mass of the regeneration stream used is not more than 15% greater than the product of the specific heat and mass of fluid stream used.

17. The process of claim 16 wherein said fluid stream is air and where said adsorbent is a desiccant.

18. The process of claim 17 wherein the amount of heat capacity material per pound of adsorbent in said adsorption zone is such that the mass of heat capacity material times its heat capacity is in the range of from about 0.2 to 50 Btu's/°F/lb of adsorbent.

19. The process of claim 18 wherein the desiccant is silica gel and the ratio of heat capacity material per pound of silica gel in said adsorption zone is such that the mass of heat capacity material times its heat capacity is in the range of from about 0.2 to 6.0 Btu/°F/lb of silica gel.

20. The process of claim 19 wherein the ratio of heat capacity material per pound of silica gel in said adsorption zone is such that the means of heat capacity material times its heat capacity is in the range of from about 0.5 to 2.0 Btu/°F/lb of silica gel.

21. A desiccant cooling process including the steps of:
passing ambient air through a desiccant zone to produce relatively dry air, said desiccant zone containing a silica gel and heat capacity material therein, the ratio of said heat capacity material per pound of desiccant being such that the mass of heat capacity material times its heat capacity is in the range of from about 0.2 to about 6.0 Btu/°F;
passing said relatively dry air through a heat storage zone to produce relatively cool dry air for use in an enclosed conditioned space;
withdrawing a stream of exhaust air from said conditioned space through an evaporative pad whereby said exhaust air is cooled;
passing said cooled exhaust air stream through said heat storage zone whereby said heat storage zone is cooled when said exhaust air is heated;
adding additional heat to said exhaust gas by heating means;
passing said heated exhaust air through said adsorption zone, whereby said adsorbent is regenerated.

22. The process of claim 21 wherein said adsorption zone and said heat storage zone are in the form of a continuously rotating segmented wheel.

* * * * *